Oct. 28, 1958    L. OCHTMAN    2,857,775
HOLDING BRAKE FOR REVERSIBLE SCREW JACK
Filed Feb. 23, 1954

INVENTOR.
LEONARD OCHTMAN
BY
*Nicholas J. Garofalo*
ATTORNEY

United States Patent Office 2,857,775
Patented Oct. 28, 1958

2,857,775

HOLDING BRAKE FOR REVERSIBLE SCREW JACK

Leonard Ochtman, Ridgewood, N. J., assignor to Bendix Aviation Corporation, Teterboro, N. J., a corporation of Delaware Application February 23, 1954, Serial No. 411,840

3 Claims. (Cl. 74—424.8)

This invention relates to a power-operated screw jack of an improved nature, having irreversible and reversible features. It is of particular use in aircraft in operating by power a control surface, such as an aileron under conditions of flight where such could not otherwise be moved by the unaided effort of the pilot. Its irreversible features permit it to hold the aileron in its last moved position against the force of thrust loads exerted by the control surface. Its reversible features permit return movement of the screw from its rotated position under the force of the thrust loads, and further allows direct manual operation of the aileron in cases of emergency or power failure.

Because of the many hazards to which aircraft are subjected during flight, manual operation of a control surface, as well as power operation thereof is also desired as a safety measure in emergencies. Various complex and cumbersome devices have been devised in some instances to this end. The present invention, however, provides a simple and practical power-operated screw jack having reversible and irreversible characteristics whereby these ends are accomplished.

The reversible and irreversible characteristics are provided by a holding brake mechanism associated with the screw jack.

Simplicity and compactness of the invention are provided by the minimum number of its parts and the linear arrangement of its general structure.

An object of the invention is, therefore, a power-operated screw jack having irreversible and reversible features for aircraft control surface operation.

Another object of the invention is a power-operated screw jack having holding mechanism that provides the jack with reversible and irreversible features.

A further object of the invention is an improved power-operated linear screw jack that is both reversible and irreversible and is characterized by the linear arrangement of its elements.

Another object of the invention is an irreversible power-operated screw jack for use in moving a control surface in an aircraft and holding the control surface irreversible in its moved position, and providing means permitting reversibility of the screw jack and allowing manual operation of the moved member when desired.

The invention further lies in the particular construction and in the relative organization and arrangement of its parts, as well as in their cooperative association with one another.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings wherein a power-operated screw jack embodying the invention is illustrated:

Figures 1, 2, 3:
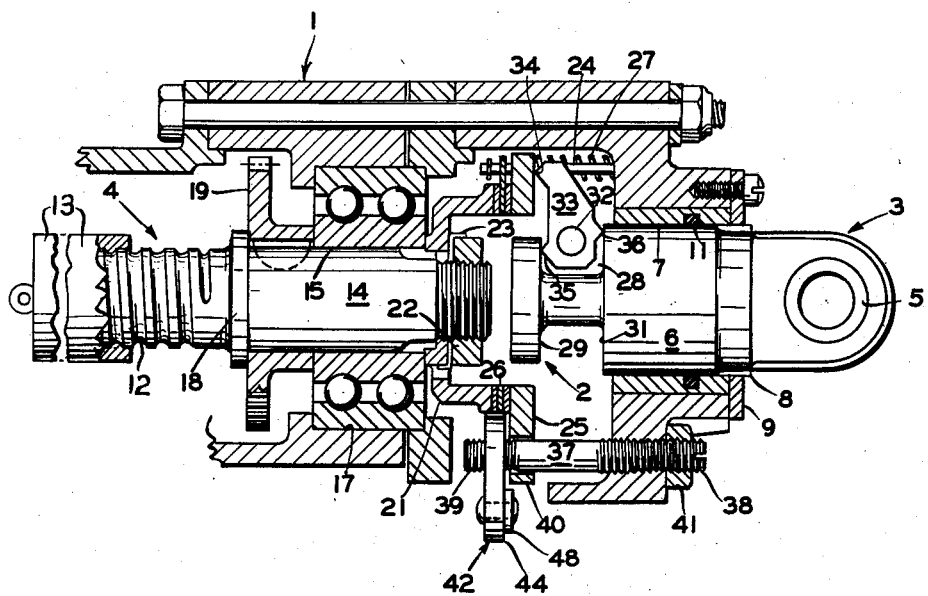
Fig. 1 is a longitudinal section thereof.
Fig. 2 is a detail of the holding brake slide pins.
Fig. 3 is a detail of linkage, drawn to a slightly smaller scale than that of Fig. 1, associating the release levers of the braking mechanism with a solenoid control.

Referring now to the drawings for a more detailed description of the invention, there is shown a housing 1, in which is incorporated a holding brake mechanism 2 which linearly associates a floating mounting element 3, carried in one end of the housing, with a reversible screw 4 carried in the opposite end of the housing.

The mounting element 3 includes an eye piece 5 adapted to be secured in suitable manner to a fixed support in an aircraft. It is provided with a cylindrical stub body portion 6 that mounts for linear sliding movement relative to a sleeve 7. The mounting element is prevented from rotating in the sleeve and is guided in the relative sliding movements by splines 8 thereon. The splines engage in splineways of a spline ring 9 secured to the outside of the housing. A rubber O-ring 11 retained in a groove of sleeve 7 serves to seal out moisture.

The screw shaft 4 extends from the opposite end of the housing. The outer portion of the screw as at 12 is provided with a suitable actuating screw nut 13 (both broken away) for association with a control surface of an aircraft, such as an aileron. The opposite end of the screw is provided with a hub shaft 14 journaled in a ball bearing block 15. The latter is held fast by the inner wall 17 of the housing. Keyed on hub shaft 14 between the outer face of the bearing and a flange 18 of the shaft is a drive gear 19. The latter serves for gearing the screw jack for operation by a proper source of power, such as an electric motor, not shown. The right end of the screw shaft projects from the bearing and has keyed thereon a friction brake cup 21. A nut 22 on the threaded end of the screw shaft together with a lock washer 23 serves to retain the brake cup against the right wall of the bearing and enable rotation of the brake cup with the screw.

Brake cup 21 is part of the holding brake mechanism. Slidably carried on a plurality of guide pins 24 is a brake ring 25 and a brake disk 26. Here, three guide pins 24 are provided to guide the sliding movements of the brake ring. These are spaced equally apart, and the ends 10 thereof are mounted in the housing. The free ends of the pins project freely through holes provided in the brake ring and disc. The holes are provided in ears 20 of the latter. The ears are arranged so that the free ends of the pins will not interfere in movements of the brake ring and disc with respect to the brake cup. Preferably, light springs 27 are carried on the pins to constantly tension the brake ring to move the friction disc 26 into light contact with the face end of the brake cup.

To add to the utility of the brake disc 26, the opposite faces thereof carry a friction surface. By this arrangement, when the surface engageable with the brake cup has become worn, the disc may be turned around and the other surface used.

Means actuable by linear sliding movements of the sleeve 7 relative to mounting eye 3 is provided to hold the brake disc in holding engagement with the brake cup so as to provide a drag upon the associated screw. To this end, an extended inner piece of the mounting element provides a deep annular recess 28. The latter provides a pair of opposing wall faces 29 and 31. Extending from the housing into this recess are a plurality of stud pins 32, on each of which is pivoted a lever 33. Here, three of these levers and pins are provided and are uniformly spaced from one another in recess 28, only one of the levers appearing in Fig. 1. Lever 33 pivots at one end thereof in the annular recess. At the upper end of lever 33 and facing toward the brake ring is a nose piece 34, and at the lower end of the lever is a pair of oppositely positioned projections 35 and 36. Projection 35 is normally in a plane a little below the horizontal axis of pivot pin 32 and moves in contact with the left wall face 29; while projection 36 is in a plane a little above the horizontal axis of the pivot pin and moves in contact with the right wall face 31. The arrangement of the braking mechanism is such with respect to the screw and mounting eye that, when the sleeve 7 and the mounting eye 3 are relatively moved by the load of the associated aileron in one direction, the wall 29 cams the projection 35 of each lever 33 to pivot the latter to press its nose end 34 against the brake ring elements so as to exert a drag or braking pressure through the brake cup upon the screw. When the sleeve 7 is drawn in the opposite direction by the aileron load, the wall 31 acts upon the projection 36 of each lever and similarly forces the brake ring to brake the screw. It can be seen that a braking action will be continually applied to the screw when loads of the control surface in either direction are present. The distances of the projections 35 and 36 along the lever 33 with respect to the positions of the pivot point and the nose projection are normally such as to provide the same leverage ratio for either direction of thrust load. This leverage ratio is such that enough braking force is applied to prevent rotation of the screw under thrust loads when the screw is not being operated. When power is applied through gear 19 for operation of the screw, the brake exerts a drag which is proportional to the thrust load.

Means are provided for releasing at will the brake drag from the screw. This means includes a plurality of screw elements or studs 37 carried uniformly apart about the braking mechanism, one of them being shown. Each stud 37 has a threaded end 38 engaged in the housing. The other end 39 of each stud element projects freely through a hole in an extended ear 40 of the brake ring. Here there are preferably but three of the stud elements 37. Threadedly carried on the projecting end 39 of each stud is a cam lever generally designated 42. When the cam lever is turned in one direction, it threads along the stud 37 to cam the brake ring 25 away from the brake cup sufficiently to release the brake drag from the brake cup and the associated screw jack. When the cam levers are turned in the opposite direction away from the brake ring, the latter is permitted to again exert a drag through the brake cup upon the screw jack. The relative position of each cam lever with respect to the brake ring is adjustable by threading stud end 38 further in or out of the housing as may be required and then setting the adjusted position with a nut 41. It is to be noted that the end 39 of stud 38 includes left hand threads for this purpose.

Provision is made for actuating all of the cam levers 42 at the same time for uniform action with respect to the brake ring. To this end, two of the cam levers are alike in form as indicated at 43 in the detail in Fig. 3; and the third lever designated 44 is substantially rectangular in form. Each lever 43 pivots at one end on its related stud 37, and at the other end it is connected by linkage 45 to a separate corner 46 of rectangular lever 44. The latter pivots at one corner to its stud 37, and at the opposite corner 47 it is connected to an arm 48 of a control element, here represented as a solenoid 49. It can be seen that pivoting the rectangular element 44 in one direction or the other will through the linkage also turn the levers 43 in the corresponding direction. Levers 43 and 44 are pivoted so as to normally hold the brake ring in a released position relative to the brake cup. This is enabled by a spring 51 on the solenoid arm, which spring continually tensions the cam levers in a position releasing the brake drag from the screw jack.

However, when the craft is in flight, the solenoid is actuated so as to pivot cam levers 43 and 44 to permit application of a braking action on the screw. In this condition a continual brake drag is applied to the screw by thrust loads exerted by the control surface and acting upon the braking mechanism through the floating mounting element 3, whereby the screw is held irreversible under action of such loads. To move the control surface in either direction, while the screw is under the braking action of the thrust loads, power is utilized and applied to the screw through the gearing 19 sufficient to overcome the dragging action of the braking mechanism. While the power is being applied to move the screw, the brake exerts a drag which is proportional to the thrust load so as to restrain reverse movement of the screw.

It is clear that, when the braking action has been released through action of the brake release mechanism 42, the screw will be reversible under the thrust loads of the control surface. While the screw is in its reversible condition, the control surface member may, in the event of a power failure, be freely operated from the pilot's stick by manual controls, not shown, which may be connected directly to the control surface.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

What is claimed is:

1. A linear screw jack of the character described comprising in combination a housing, a screw element rotatably mounted in said housing and extending out of one end of the housing, an actuating screw nut mounted on said one end of said screw element, gear means carried by said screw element for operatively connecting said screw element to a prime mover, a mounting element linearly opposed to said screw element and extending out of the other end of the housing, said housing and screw being axially movable together relative to said mounting element under axial loads exerted thereon through said screw nut, braking mechanism within the housing intermediately of the inner end of the screw and the inner end of the mounting element for exerting a restraint upon the screw, the braking mechanism including a first section carried by the screw and a second section carried by the housing and arranged to frictionally engage said first section, actuating means carried by said housing and operable by the mounting element to cause engagement of the second section with the first section when said housing moves axially relative to said mounting element, and controls means connected to said second section and arranged to release said second section of the braking mechanism from the first section.

2. A linear screw jack of the character described comprising in combination a housing, a screw element rotatably mounted in said housing and extending out of one end of the housing, an actuating screw nut mounted on said one end of said screw element, gear means carried by said screw element for operatively connecting said screw element to a prime mover, a mounting element linearly opposed to said screw element and extending out of the other end of the housing, said housing and screw being axially movable together relative to said mounting element under axial loads exerted thereon through said screw nut, braking mechanism within the housing intermediately of the inner end of the screw and the inner end of the mounting element for exerting a restraint upon the screw, the braking mechanism including a first section carried by the screw and a second section carried by the housing and arranged to frictionally engage said first section, actuating means carried by said housing and operable by the mounting element to cause engagement of the second section with the first section when said housing moves axially relative to said mounting element, control means connected to said second section and arranged to release said second section of the braking mechanism from the first section, said mounting element having an annular recess with an inner shoulder and an outer shoulder adjacent said second section of said braking mechanism, said actuating means including a plurality of levers axially-pivotally-mounted at one end on equi-spaced stud pins which extend through said recess and are mounted in said housing, said levers having their other ends in contact with said second section of the braking mechanism, said pivoted ends of said levers having projections extending from opposite sides to contact said inner and outer shoulders of said recess, the projections extending to said inner shoulder being below the pivot axis of said lever and the projections extending to said outer shoulder being above the pivot axis of said lever so that said levers cooperate with said mounting element to engage said braking mechanism when the relative axial movement between said housing and said mounting element is in either direction.

3. A screw jack of the character described including an actuating screw nut operably mounted on an outer end of a screw, the inner end of said screw being fixed-axially and rotatably-mounted in a housing, said housing being axially-slidably mounted on a mounting element, friction means arranged to restrain rotation of said screw when said screw and housing are subject to axial loads and when relative movement between said housing and said mounting element occurs, said friction means including a brake cup mounted on the inner end of said screw and a friction disc slidably mounted in said housing to engage said cup, said friction means further including an actuating device carried by said housing and arranged to urge said disc against said cup due to relative axial movement between said housing and said mounting element, control means arranged to release the friction disc from engagement with the cup, said control means including a plurality of cam levers arranged to uniformly cam the friction disc from the brake cup, and solenoid means arranged to control the action of said cam levers.

References Cited in the file of this patent
UNITED STATES PATENTS

| | | |
|---|---|---|
| 803,614 | Miller | Nov. 7, 1905 |
| 1,819,385 | Radford | Aug. 18, 1931 |
| 1,846,333 | Hott | Feb. 23, 1932 |
| 2,444,886 | Vickers | July 6, 1948 |